United States Patent
Amano

(10) Patent No.: US 6,637,923 B2
(45) Date of Patent: Oct. 28, 2003

(54) VEHICULAR LAMP WITH LED LIGHT SOURCE HAVING UNIFORM BRIGHTNESS

(75) Inventor: Yasuyuki Amano, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/212,038

(22) Filed: Aug. 6, 2002

(65) Prior Publication Data
US 2003/0035298 A1 Feb. 20, 2003

(30) Foreign Application Priority Data
Aug. 15, 2001 (JP) ........................................ 2001-246632

(51) Int. Cl.[7] .......................................... F21W 101/02
(52) U.S. Cl. ........................ 362/545; 362/544; 362/540; 362/241; 362/297; 362/346
(58) Field of Search ................................ 362/545, 544, 362/543, 542, 541, 540, 241, 245, 297, 346, 800

(56) References Cited

U.S. PATENT DOCUMENTS

| | | | |
|---|---|---|---|
| 4,646,207 A | | 2/1987 | Levin et al. ................... 362/80 |
| 4,929,866 A | * | 5/1990 | Murata et al. ............... 332/297 |
| 5,054,885 A | | 10/1991 | Melby ........................ 359/618 |
| 5,453,855 A | | 9/1995 | Nakamura et al. ............. 359/49 |
| 5,642,933 A | * | 7/1997 | Hitora ........................ 362/243 |
| 6,234,646 B1 | * | 5/2001 | Ito ............................. 362/235 |
| 6,257,737 B1 | * | 7/2001 | Marshall et al. ............. 362/231 |
| 6,280,480 B1 | * | 8/2001 | Tuttle et al. ................. 362/585 |
| 6,474,852 B1 | * | 11/2002 | Ohkohdo et al. ........... 362/487 |

FOREIGN PATENT DOCUMENTS

| | | |
|---|---|---|
| DE | 19638081 A1 | 3/1998 |
| JP | 11-306810 | 11/1999 |

* cited by examiner

*Primary Examiner*—Laura K. Tso
(74) *Attorney, Agent, or Firm*—Sughrue Mion, PLLC

(57) ABSTRACT

A vehicular lamp which irradiates a light by means of indirect illumination employing an LED light source and having an improved appearance when the lamp is lit. Light from an LED light source is formed into an upward parallel light flux by a Fresnel lens and reflected toward the front of a lamp by a reflector. The reflecting surface of the reflector is formed in a stepped shape by providing a reflective element and a step portion in each of a plurality of segments which are sectioned at a uniform interval in a vertical direction. The width in the longitudinal direction of the lamp of each of the reflective elements is gradually increased as the distance of the reflective elements increases from the intersection of the central axis of the parallel light flux and the reflecting surface. Accordingly, the incident light flux is made substantially constant among all the reflective elements, and hence the brightness of the light emitted by the lamp is made uniform.

15 Claims, 10 Drawing Sheets

US 6,637,923 B2

VEHICULAR LAMP WITH LED LIGHT SOURCE HAVING UNIFORM BRIGHTNESS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to a vehicular lamp of a type employing an LED light source, and more particularly to such a vehicular lamp which is constructed so as to radiate light by indirect illumination.

Recently, vehicular lamps provided with an LED light source have frequently been employed. As described in Japanese Patent Application Laid-Open No. 11-306810, a lamp has been developed which provides a soft lighting effect using an indirect illumination technique whereby the LED light source is arranged so as not to be visible from the front of the lamp. To achieve this effect, the lamp employs a Fresnel lens together with the LED light source.

As shown in FIG. 10, such a lamp is structured such that light from an LED light source 102, which is arranged facing upward, is formed into an upward directed parallel light flux by a Fresnel lens 104 provided near the upper side of the LED light source 102, and the parallel light flux from the Fresnel lens 104 is then directed in a diffused manner toward the front of the lamp by a reflector 106. The reflector 106 of the vehicular lamp is formed with a stepped shape whereby the reflecting surface 106a thereof is divided into a plurality of segments arranged at a uniform interval H' with respect to the vertical direction (the direction of the optical axis Ax' of the Fresnel lens 104), and a reflective element 106s reflecting the parallel light flux in a diffused manner toward the front of the lamp and a step portion 106r extending in the vertical direction are provided in each of the segments.

In the conventional vehicular lamp described above, since the reflector 106, which is formed generally as a flat plate, is inclined at a predetermined angle with respect to the direction of the optical axis Ax', and the widths of the reflective elements 106s in the longitudinal direction of the lamp are all the same value w' (the heights of the reflective elements 106s in the vertical direction are all the same width h'), problems as will now be described occur.

Since the light emitted by the LED light source 102 has a luminous intensity distribution I wherein the maximum luminous intensity occurs in the directly frontward direction and the luminous intensity is reduced as the angle with respect to the directly frontward direction increases, the light flux per unit area of the Fresnel lens 104 is high in an area near the optical axis Ax' and becomes reduced in peripheral areas. Further, a solid angle per unit area of the Fresnel lens 104 with respect to the LED light source 102 is large in the area near the optical axis Ax and becomes small in the peripheral areas ($\theta a' > \theta b' > \theta c' > \theta d'$). Accordingly, the light flux per unit area striking the reflective elements 106s in peripheral areas on both of upper and lower sides of the central area near an intersection point C' with respect to the optical axis Ax' on the reflecting surface 106a is smaller ($\varphi a' > \varphi b' > \varphi c' > \varphi d'$) than that striking the reflective elements 106s constituting the central area.

Therefore, when viewing the reflecting surface 106a of the reflector 106 from the front of the lamp when the lamp is lit, while the reflective elements 106s in the central area are seen brightly, the reflective elements 106s constituting the peripheral areas appear dark, so that there is a problem that the overall appearance of the lamp is not as good as desired.

Taking the foregoing into consideration, it is an object of the present invention to provide a vehicular lamp of a type in which light from an LED light source is irradiated by indirect illumination whereby the lamp has an improved appearance when the lamp is lit.

BRIEF SUMMARY OF THE INVENTION

The present invention achieves the above and other objects by providing a lamp of the above-described type but in which the size of each of the reflective elements constituting the reflecting surface of the reflector is determined so as to obtain more uniform illumination.

More specifically, a vehicular lamp according to the present invention comprises an LED light source, a lens for forming light from the LED light source into a parallel light flux, a reflector for reflecting the parallel light flux toward the front of the lamp, and a translucent cover provided in front of the reflector of the lamp, wherein the reflecting surface of the reflector is sectioned into a plurality of segments at a substantially uniform interval with respect to the radiating direction of the parallel light flux, and a reflective element and a step portion are provided in each of the segments, whereby the reflecting surface is formed in a stepped shape, and the width in a longitudinal direction of the lamp of each of the reflective elements is determined such that, compared to a reflective element constituting a central area positioned near an intersection point with respect to a central axis of the parallel light flux on the reflecting surface, reflective elements is peripheral areas on both sides in the radiating direction of the parallel light flux with respect to the central area becomes wider.

The specific structure of the lens is not particularly limited as far as the lens can form the light from the LED light source into a parallel light flux, for example, it is possible to employ a single spherical lens, a combination lens, a Fresnel lens or the like.

The direction of the optical axis of the lens is not limited to a specific direction as far as the direction corresponds to a direction intersecting the longitudinal direction of the lamp, for example, it is possible to set the direction of the optical axis in an upward direction or a lateral direction by making the direction perpendicular to the longitudinal direction of the lamp.

The central axis of the parallel light flux is generally set to be coaxial with the optical axis of the lens; however, it may be set to a direction slightly inclined with respect to the optical axis of the lens. The latter setting can be achieved by arranging the LED light source at a position offset from the optical axis of the lens, providing light deflecting means near the reflector side of the lens, or the like.

As described above, the vehicular lamp according to the present invention is structured such that the reflecting surface of the reflector which reflects the light from the LED light source, made into the form of a parallel light flux by the Fresnel lens, toward the front of the lamp is sectioned into a plurality of segments substantially at a uniform interval with respect to the radiating direction of the parallel light flux. Moreover, a reflective element and a step portion are provided in each of the segments, whereby the reflecting surface is formed in the stepped shape. The width in the longitudinal direction of the lamp of each of the reflective elements is determined such that the reflective elements constituting the peripheral areas on both sides in the radiating direction of the parallel light flux with respect to the central area near the intersection point with the central axis of the parallel light flux on the reflecting surface are wider than the reflective elements constituting the central area. Due to this construction, the following effects are obtained.

That is, as described above, since the light flux per unit area of the parallel light flux reaching the reflecting surface of the reflector from the lens is smaller in the peripheral areas than in the central area of the reflecting surface in the conventional lamp, the reflective elements constituting the central area generally appear bright while the reflective elements constituting the peripheral areas appear more dark when viewing the reflecting surface of the reflector from the front of the lamp when the lamp is lit. On the contrary, according to the present invention, since the width in the longitudinal direction of the lamp of each of the reflective elements is greater for the reflective elements constituting the peripheral areas than for the reflective elements constituting the central area, such a difference in brightness between the reflective elements constituting the central area and the reflective elements constituting the peripheral areas is significantly reduced.

Therefore, the inventive vehicular lamp wherein light from an LED light source is radiated by indirect illumination has an improved appearance when the lamp is lit.

In the lamp structure described above, in the case where the width in the longitudinal direction of the lamp of each of the reflective elements increases as the position of the reflective element increases on both sides in the radiating direction of the parallel light flux from the intersection point between the parallel light flux and the central axis on the reflecting surface, it is possible to make the difference in brightness much smaller between the reflective elements constituting the central area and the reflective elements constituting the peripheral areas.

Moreover, in the case where the width in the longitudinal direction of the lamp of each of the reflective elements is such that the incident light fluxes onto all the reflective elements are substantially equal to each other, the brightnesses of the reflective elements are made uniform over the entire reflecting surface.

Further, in the lamp constructed as described above, in the case where each of the reflective elements is constituted by a curved surface which reflects the parallel light flux from the lens in a diffused manner in both vertical and lateral directions, it is possible to obtain a required lamp light distribution performance even if the cover of the lamp is translucent and generally plain. In the case where the diffused reflection angle of each of the reflective elements is substantially the same, each of the reflective elements will be seen in substantially the same brightness within the same angular range when viewed from an oblique direction with respect to the forward direction of the lamp.

Alternatively, each of the reflective elements can be constituted by a flat plane so as to reflect the parallel light flux from the lens toward the front of the lamp while maintaining the light flux parallel, in which case diffusion lens elements are formed in the translucent cover or the like, thereby diffusing the light in the vertical direction and the lateral direction. Otherwise, the reflective elements may be constituted by a curved surface having curvature only in one direction so as to reflect the parallel light flux from the lens toward the front of the lamp only in one direction in a diffused manner, and diffusion lens elements are formed in the translucent cover or the like, thereby diffusing the light in the direction perpendicular to the above-mentioned one direction.

Further, in the case where the lens is constituted by a Fresnel lens in which a plurality of Fresnel lens elements are formed on the surface on the lens plate on the side of the LED light source, and a plurality of deflection lens elements for emitting the parallel light flux transmitted through the Fresnel lens in a direction inclined at a predetermined angle with respect to the optical axis of the Fresnel lens are formed on the lens plate on the side of the reflector, the following operations and effects can be obtained.

That is, due to limitations on the lamp layout or the like it may be difficult to arrange the reflecting surface of the reflector at a directly frontward position in the direction of the optical axis of the lens. However, in the case where the parallel light flux is emitted in a direction inclined at a predetermined angle with respect to the optical axis of the Fresnel lens, it is possible to radiate the parallel light flux in the same direction in which the reflecting surface is arranged, even if the reflecting surface of the reflector is arranged at a position slightly shifted from the directly frontward position in the direction of the optical axis of the lens. Accordingly, it is possible to increase the freedom of design choice with respect to the shape of the reflector while maintaining the effect of reducing the difference in brightness between the reflective elements constituting the central area of the reflection area and the reflective elements constituting the peripheral areas. Further, it is possible to achieve the effects mentioned above using only a single Fresnel lens.

The vehicular lamp according to the present invention may be structured so as to irradiate only the light from the LED light source via the lens, the reflector and the translucent cover. However, a second lamp unit may be additionally provided. In such a case, the lamp unit may be mounted to the front of the LED light source and the lens of the lamp, and it is possible to make the LED light source and the lens invisible from the front of the lamp, whereby it is possible to improve the appearance of the lamp. In this case, specific structure, type, shape and the like of the second lamp unit are not particularly limited.

DETAILED DESCRIPTION OF THE INVENTION

A description will be given below of a preferred embodiment constructed according to the present invention with reference to the accompanying drawings.

Figure 1:
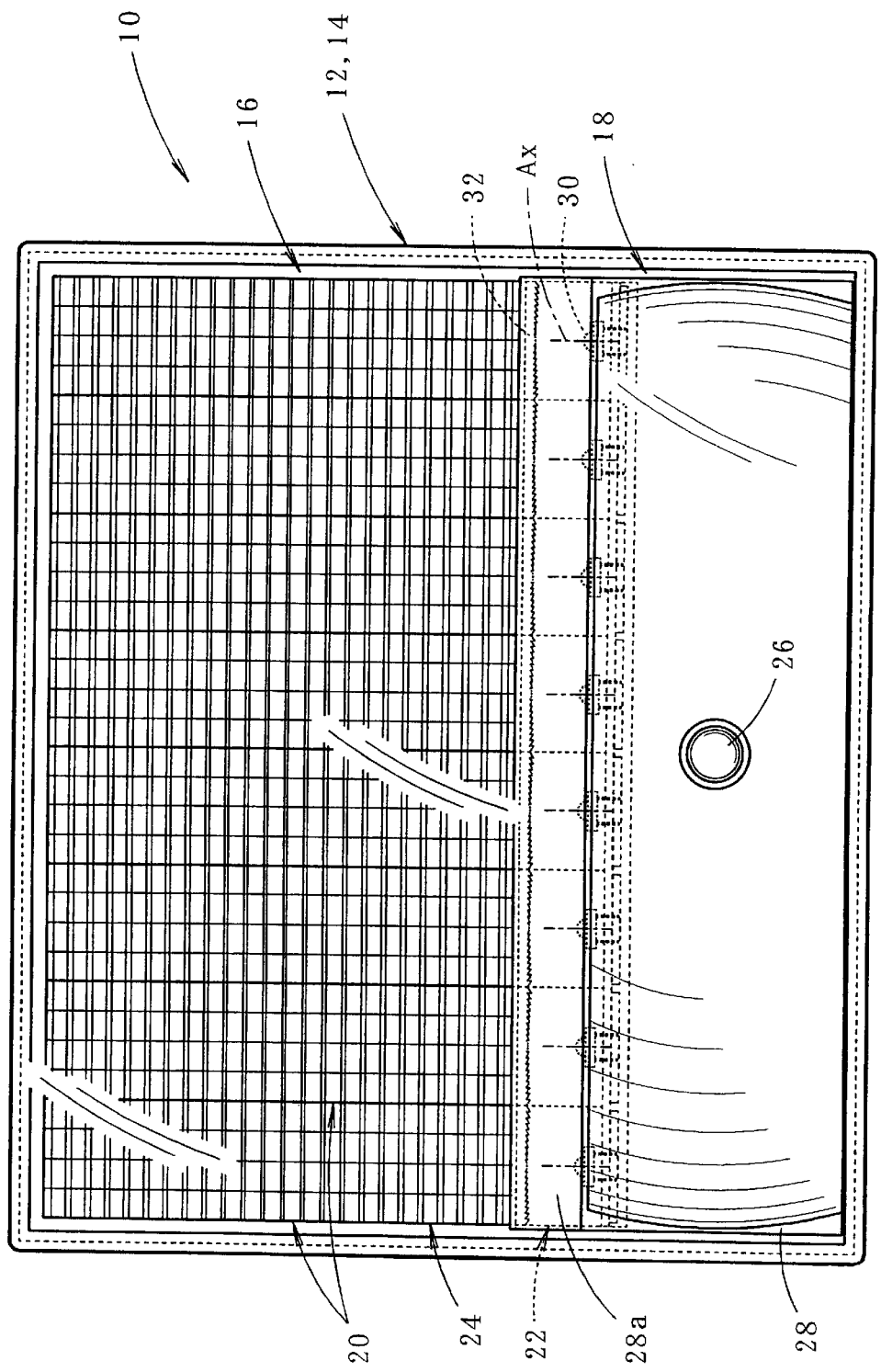
FIG. 1 is a front elevational view showing a vehicular lamp constructed according to a preferred embodiment of the present invention.
Figure 2:
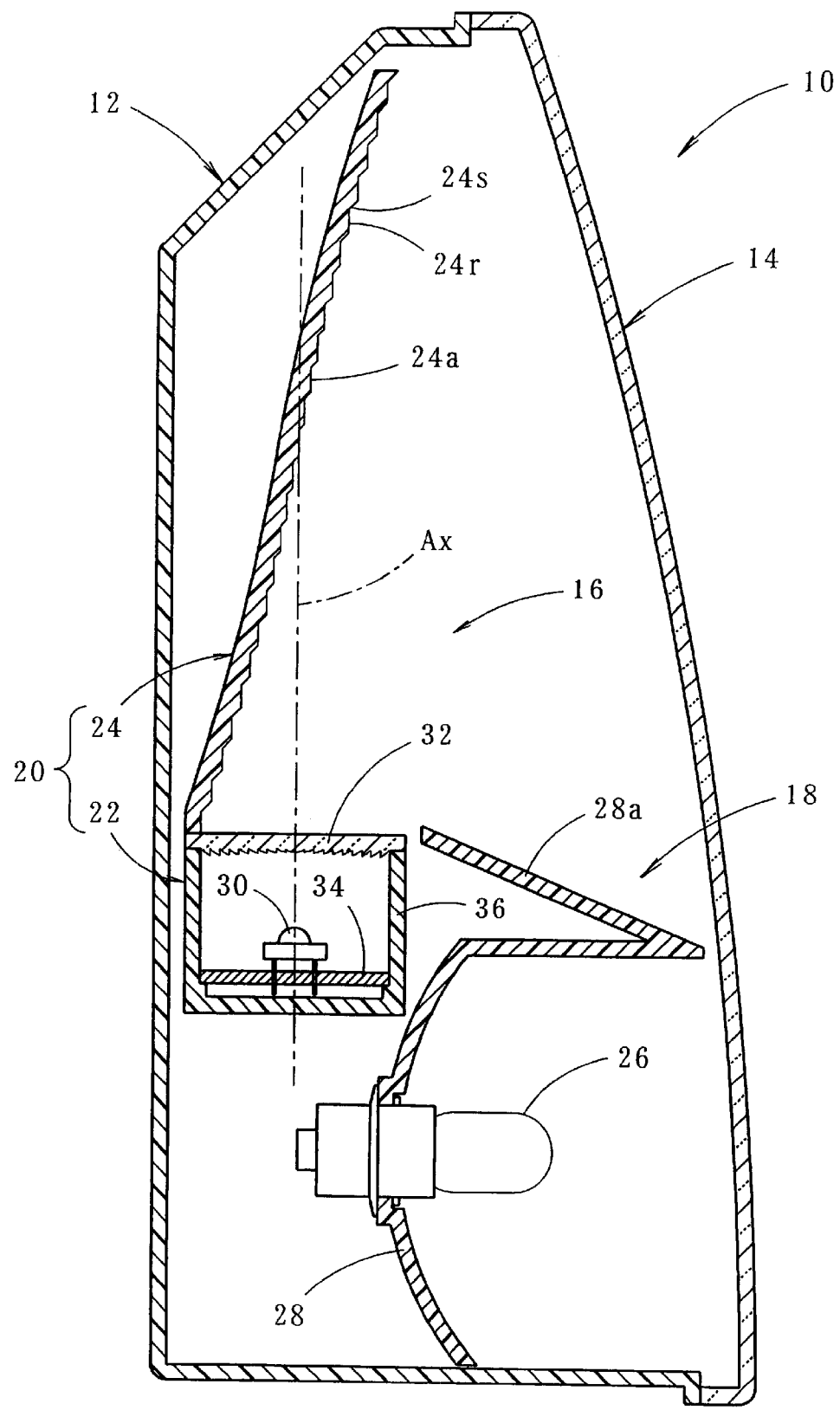
FIG. 2 is a lateral cross-sectional view of the vehicular lamp of FIG. 1.

FIGS. 1 and 2 are a front elevational view and a lateral cross-sectional view showing a vehicular lamp constructed according to the present embodiment.

As shown in these drawings, a vehicular lamp 10 according to the present embodiment takes the form of a rear combination lamp adapted to be mounted at the rear end of a vehicle. The lamp is structured such that a lamp unit 16 for a tail and stop lamp and a lamp unit 18 for a turn signal lamp are provided within a lamp chamber constituted by a lamp body 12 and a plain translucent cover 14. (By "plain" is meant that the cover contains no diffusion lens elements.)

The lamp unit 16 includes a plurality of LED units 20, each constituted by a light source unit 22 and a reflector 24, arranged adjacent to and attached to each other in a lateral direction. The lamp unit 16 is adapted to be mounted at an upper rear portion within the lamp chamber. (In this case, "rear" refers to the rear of the lamp, which is oriented in the direction of the front of the vehicle. The same directional reference applies in the following description.)

The lamp unit 18, which employs a single light source bulb 26 and a reflector 28, is mounted at a lower front position within the lamp chamber. An extension portion 28a extending upward and tilted to the rear is formed in an upper portion of a front end in the reflector 28 of the lamp unit 18. This extension portion 28a extends to a position slightly above an upper end surface of the light source unit 22 in the lamp unit 16, whereby the light source unit 22 is not visible from a directly frontward direction of the lamp.

Figure 3:
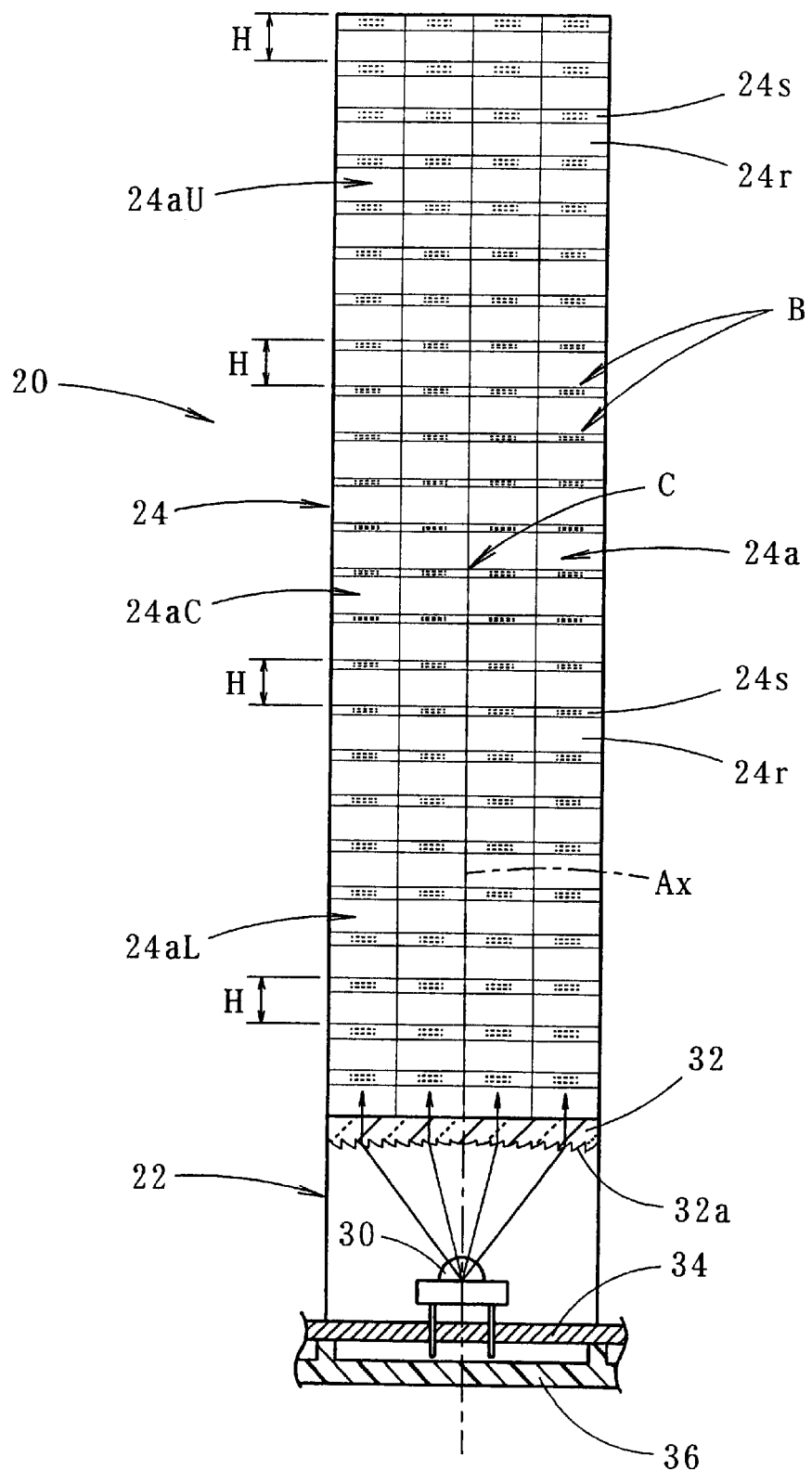
FIG. 3 is a partially cut-away front elevational view showing one of a plurality of LED units of the vehicular lamp of FIG. 1.
Figure 4:
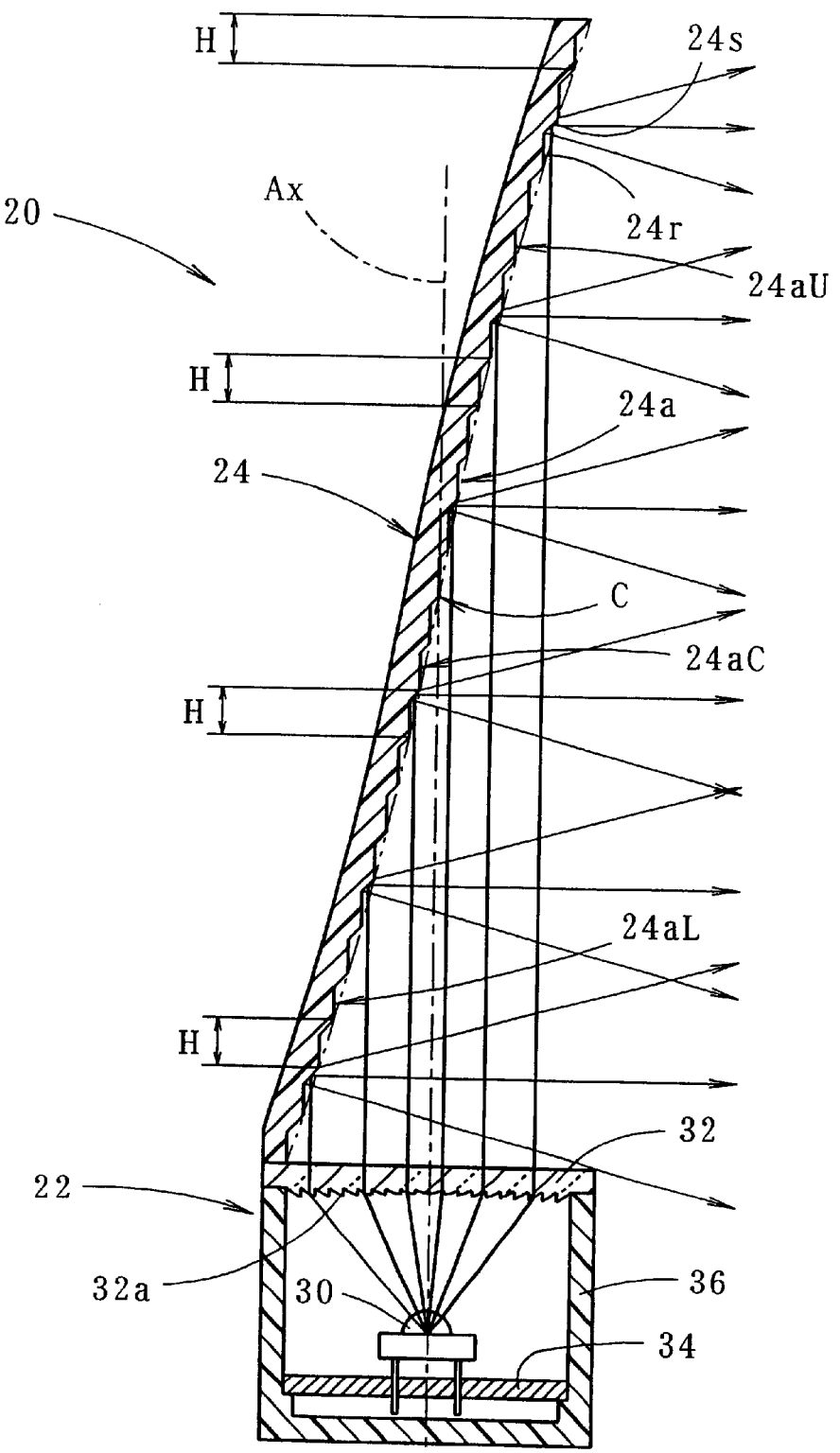
FIG. 4 is a lateral cross-sectional view showing the LED unit.
Figure 5:
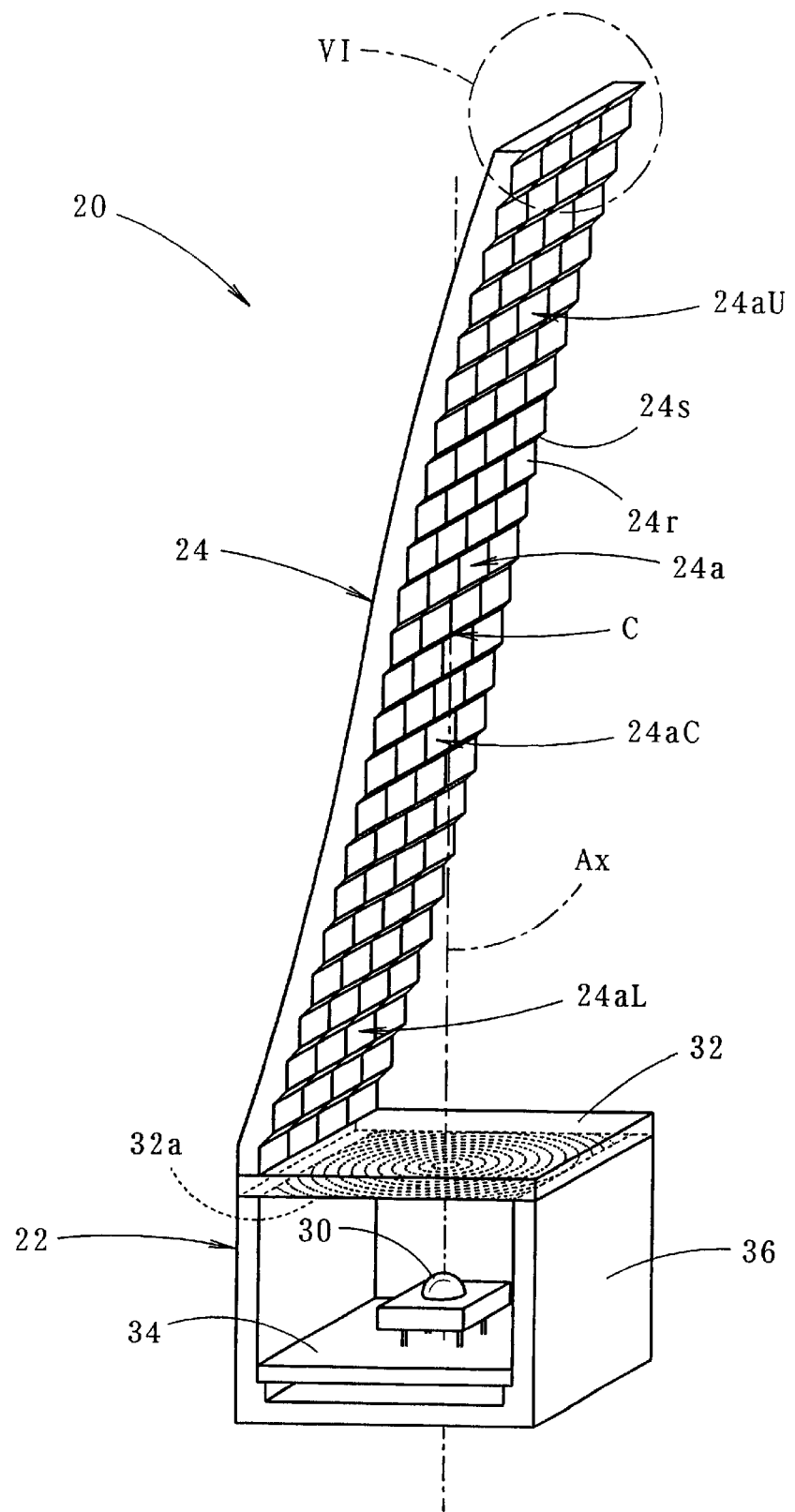
FIG. 5 is a perspective view showing the LED unit.

FIGS. 3, 4 and 5 are, respectively, a front elevational view, a lateral cross-sectional view and a perspective view which show in a cut-out manner one of the plurality of LED units 20 constituting the lamp unit 16.

As shown in these drawings, the light source unit 22 of each of the LED units 20 is constituted by an LED light source 30 arranged facing upward, a Fresnel lens 32 which converts light from the LED light source 30 into a parallel light flux, a printed circuit board 34 supporting the LED light source 30, and a housing 36 supporting the printed circuit board 34 and the Fresnel lens 32. The Fresnel lens 32 has an optical axis Ax extending in a vertical direction so as to pass through a central position of the LED light source 30, and a Fresnel lens portion 32a is formed on a lower surface thereof. The printed circuit board 34 and the housing 36 are formed so as to extend in a lateral direction across the width of the lamp unit 16.

The reflector 24 of each of the LED units 20 is formed so as to extend upward. The reflector 24 is tilted to the front from a rear end portion of the light source unit 22, and is structured so as to reflect the parallel light flux radiated upward from the Fresnel lens 32 substantially at right angles toward the front of the lamp. The reflector 24 also extends in a lateral direction across the width of the lamp unit 16.

The reflecting surface 24a of the reflector 24 is sectioned into a plurality of segments (twenty-four segments in this example) at a uniform interval H with respect to the vertical direction, and a reflective element 24s and a step portion 24r are formed in each of the segments, whereby the reflecting surface has a stepped shape. The reflecting surface 24a reflects the parallel light flux from the Fresnel lens 32 toward the front of the lamp in a diffused manner from each of the reflective elements 24s. Each of the step portions 24r is formed in a vertical plane such that the parallel light flux from the Fresnel lens 32 does not strike the step.

The width in the longitudinal direction of the lamp of each of the reflective elements 24s is determined such that the width of the reflective elements 24s constituting peripheral areas 24aU and 24aL on both upper and lower sides of the reflective elements 24s constituting a central area 24aC is greater than the width of the reflective elements 24s constituting the central area 24aC positioned near the intersection point C with respect to the optical axis Ax (corresponding to the central axis of the parallel light flux mentioned above) of the Fresnel lens 32 on the reflecting surface 24a. The reflecting surface 24a is sectioned into a plurality of segments (four segments in this example) at a uniform interval with respect to the horizontal direction, and a reflective element 24s and step portion 24r are provided in each of the segments. The reflective element 24s and the step portion 24r constituting each of the segments have the same shape in the same stage in the vertical direction.

Figure 6:
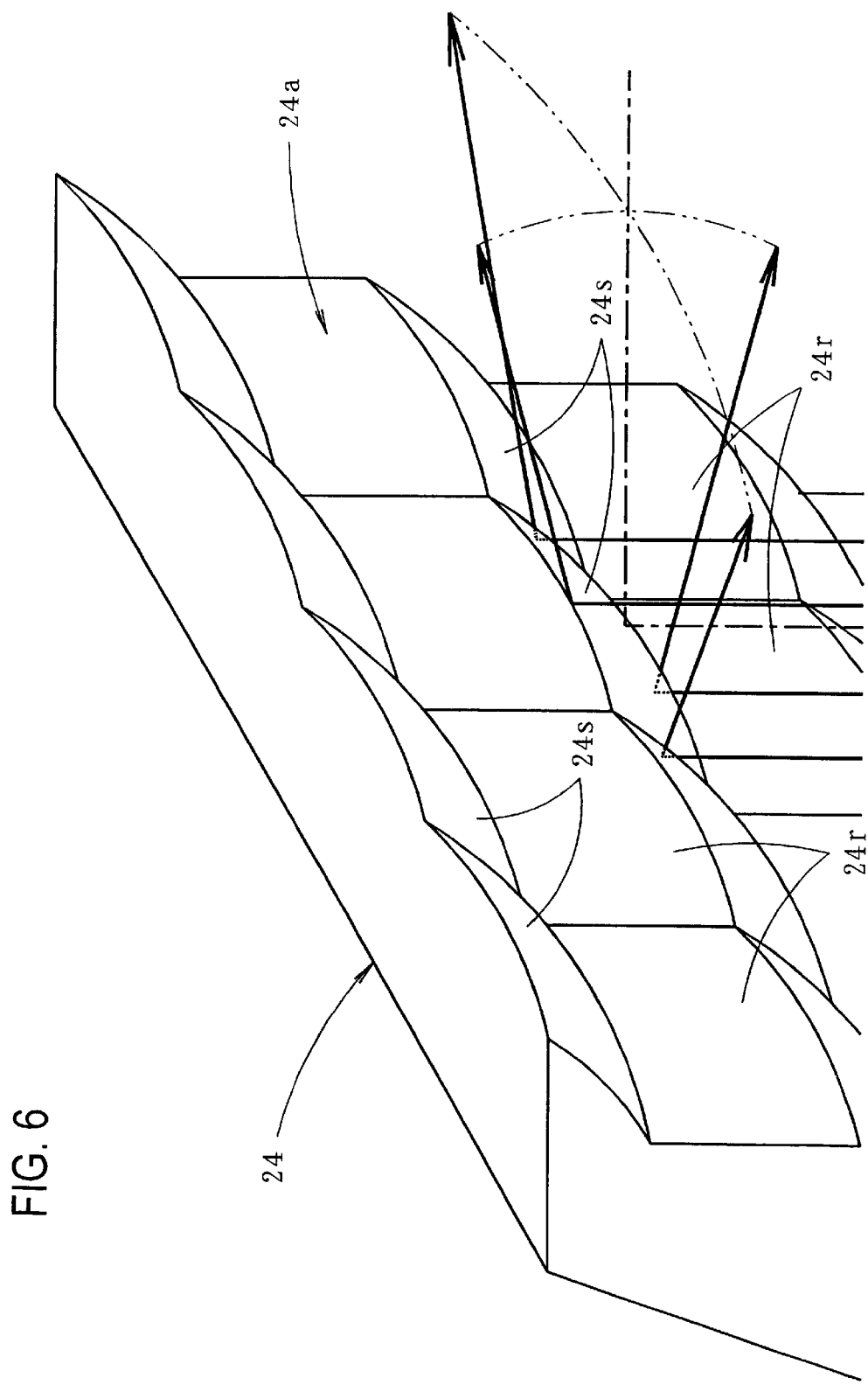
FIG. 6 is a detailed view of a portion VI indicated in FIG. 5.

FIG. 6 is a detailed view of a portion VI indicated in FIG. 5. As illustrated, each of the reflective elements 24s is constructed of a substantially spherical curved surface so as to reflect the parallel light flux from the Fresnel lens 32 in a diffused manner at predetermined diffusion angles in vertical and lateral directions with respect to a directly frontward direction of the lamp. The diffusion angles in the vertical direction and the lateral direction of each of the reflective elements 24s are the same among the reflective elements 24s. Further, each of the step portions 24r is constituted by a cylindrical curved surface so as to connect the vertically adjacent reflective elements 24s.

Figure 7:
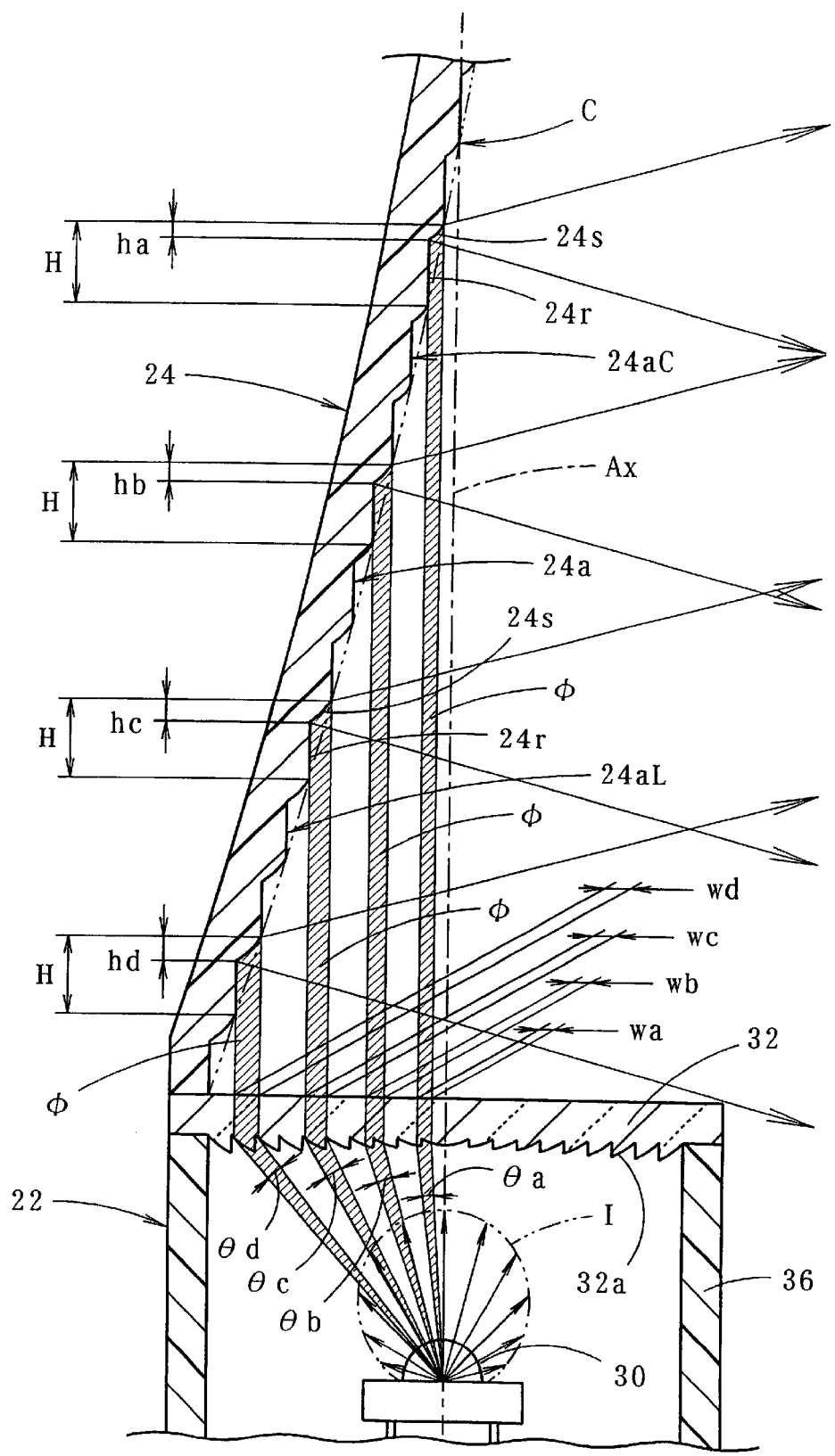
FIG. 7 is a partial detailed view of FIG. 4.

FIG. 7 is a partial detailed view of FIG. 4. As illustrated, in a lower side area from the intersection point C with respect to the optical axis Ax on the reflecting surface 24a, the width in the longitudinal direction of the lamp of each of the reflective elements 24s gradually becomes greater as the distance of the reflective element 24s increases in a downward direction from the intersection point C (wa<wb<wc<wd). Since each of the reflective elements 24s is formed with a curved surface, for which a plane inclined 45° with respect to the vertical direction serves as a reference surface, in order to satisfy the requirement of reflecting the parallel light flux from the Fresnel lens 32 toward the front of the lamp, the width in the vertical direction is made equal to the width in the longitudinal direction of the lamp, that is, ha=wa, hb=wb, hc=wc, hd=wd. Accordingly, the width in the vertical direction is set so as to gradually increase as the distance of each of the reflective elements 24s increases in the downward direction from the intersection point C (ha<hb<hc<hd).

The width in the longitudinal direction of the lamp of each of the reflective elements 24s is determined such that the incident light flux ø on each of the reflective elements 24s is substantially the same. The width in the vertical direction is determined in the same manner. In order to achieve this, the width in the longitudinal direction of the lamp of each of the reflective elements 24s is determined such that the light from the LED light source 30 passes through a vertically oriented projection surface with respect to the Fresnel lens 32 of each of the reflective elements 24s with the magnitude of the light flux being substantially the same for all such elements. However, the light emitted by the LED light source 30 has a luminous intensity distribution I in which the maximum luminous intensity occurs in the directly frontward direction of the LED light source 30 with the luminous intensity being reduced as the angle with respect to the directly frontward direction increases, as shown by a two-dot chain line in FIG. 7. Therefore, the light flux per unit area of the Fresnel lens 32 is reduced in accordance with the distance from the optical axis Ax. Accordingly, the solid angle on the basis of the position of the LED light source 30 may be made larger so as to take into account the reduced amount of light flux as the distance of the vertical projection surface increases away from the optical axis Ax (θa<θb<θc<θd).

In forming the reflecting surface 24a, the reference surface for forming the reflecting surface 24a has a slightly convex surface shape, as shown by a two-dot chain line in the drawing.

In the area above the intersection point C with respect to the optical axis Ax on the reflecting surface 24a, the width in the longitudinal direction of the lamp of each of the reflective elements 24s increases gradually as the distance of the reflective element 24s increases upward from the intersection point C. The width in the vertical direction is determined in the same manner. When forming the reflecting surface 24a in the manner described above, the reference surface for forming the reflecting surface 24a has a slightly recessed surface shape, as shown by a two-dot chain line in FIG. 4.

Next, a description will be given of the operation of the lamp of the present embodiment.

In the conventional lamp, the reflecting surface 24a is sectioned into a plurality of segments at a uniform interval with respect to the vertical direction and a reflective element 24s having the same shape and size as all the other elements is formed in each of the segments. In this case, the light flux per unit area of the parallel light flux striking the reflecting surface 24a of the reflector 24 is smaller in the peripheral areas 24aU and 24aL than in the central area 24aC of the reflecting surface 24a. Therefore, the reflective elements 24s constituting the central area 24aC appear bright and the reflective elements 24s constituting the peripheral areas 24aU and 24aL appear dark when viewing the reflecting surface 24a of the reflector from the front of the lamp when the lamp is lit.

On the contrary, in the lamp constructed according to the present embodiment, the width in the longitudinal direction of the lamp of each of the reflective element 24s is made larger for the reflective elements 24s constituting the peripheral areas 24aU and 24aL than for the reflective elements 24s constituting the central area 24aC of the reflecting surface 24a. Therefore, the difference in brightness between the reflective elements 24s constituting the central area 24aC and the reflective elements 24s constituting the peripheral areas 24aU and 24aL is significantly reduced.

Therefore, in the vehicular lamp 10 according to the present invention structured so as to radiate light by indirect illumination using the LED light source 30, the appearance when the lamp is lit is improved.

Further, because the width in the longitudinal direction of the lamp of each of the reflective elements 24s gradually increases as the distance of the reflective element 24s increases on both upper and lower sides from the intersection point C with respect to the optical axis Ax of the Fresnel lens 32 on the reflecting surface 24a, the difference in brightness between the reflective elements 24s constituting the central area 24aC of the reflecting surface 24a and the reflective elements 24s constituting the peripheral areas 24aU and 24aL is made small.

The width in the longitudinal direction of the lamp of each of the reflective elements 24s is determined such that the incident light flux ø on each of the reflective elements 24s is substantially the same. Therefore, it is possible to obtain a substantially uniform brightness of the reflective elements 24s over the entire reflecting surface 24a.

Further, in the above-described embodiment each of the reflective elements 24s is constituted by curved surface for reflecting the parallel light flux from the Fresnel lens 32 in a diffused manner in vertical and lateral directions. As a result, it is possible to obtain the desired light distribution performance even if the translucent cover 14 is plain. Moreover, the following effects can be obtained.

That is, as shown in FIG. 3, when viewing the LED unit 20 when lit from directly in front of the lamp, the reflecting surface 24a radiates light in a scattered manner in all directions at every reflective element 24s. In FIG. 3, a portion indicated by reference symbol B in the figure is a bright portion that appears at the center of each of the reflective elements 24s. Since the incident light flux of the parallel light flux striking each of the reflective elements 24s is substantially uniform, the brightness of all of the reflective elements 24s is made substantially constant over the entire the reflecting surface 24a.

Further, when changing the viewing position upward, downward, leftward, or rightward from the position directly in front of the lamp, the position of the bright portion B also moves upward, downward, leftward, and rightward within each of the reflective elements 24s. However, since the diffusion angle of each of the reflective elements 24s is the same among all the reflective elements 24s, all the reflective elements 24s appear at substantially the same brightness, until all the reflective elements 24s become dark at once when a certain maximum diffusion angle is exceeded. Accordingly, the appearance of the lamp is further improved since the appearance is substantially constant for all viewing angles.

Still further, rather than constructing each of the reflective elements 24s as a substantially spherical curved surface, it is possible to diffuse the light in the vertical and lateral directions by constructing each of the reflective elements 24s as a flat plane so as to reflect the parallel light flux from the Fresnel lens 32 toward the front of the lamp while maintaining the light flux parallel, while providing diffusion lens elements on the translucent cover 14 (or, alternatively, on an inner lens). Alternatively, it is possible to reflect the parallel light flux from the Fresnel lens 32 toward the front of the lamp in a diffused manner only in one direction by constructing each of the reflective elements 24s as a curved surface having a curvature only in one direction and to diffuse the light in a direction perpendicular to the one direction mentioned above by forming diffusion lens elements on the translucent cover 14 or the like.

The vehicular lamp 10 according to the present embodiment is structured such that the lamp unit 16 for the tail and stop lamp and the lamp unit 18 for the turn signal lamp are received within the lamp chamber constituted by the lamp body 12 and the plain translucent cover 14. However, since the lamp unit 18 is provided on the front of the light source unit 22 of the lamp unit 16 of the lamp, it is possible to make the light source unit 22 invisible from the front of the lamp, whereby it is possible to improve an appearance of the lamp.

In the embodiment described above, the reflecting surface 24a of the reflector 24 in each of the LED units 20 is divided into a plurality of segments (four segments in the example given) at a uniform interval with respect to the horizontal direction, and a reflective element 24s and step portion 24r are formed in each of the segments. However, since each of the reflective element 24s and the step portion 24r constituting each of the segments are formed in the same shape in each of the stages, the segments constituting the adjacent stages do not have the same brightness. To make the brightnesses more uniform, the width in the lateral direction of the reflector 24 of each of the LED units 20 may be decreased.

The embodiment described above relates to the case where the lamp unit 16 is intended for a tail and stop lamp. However, the general concept of the present invention can be applied to other types of lamps (for example, a lamp unit for a clearance lamp or the like) while retaining the same operations and effects as those of the embodiment mentioned above.

Figure 8:
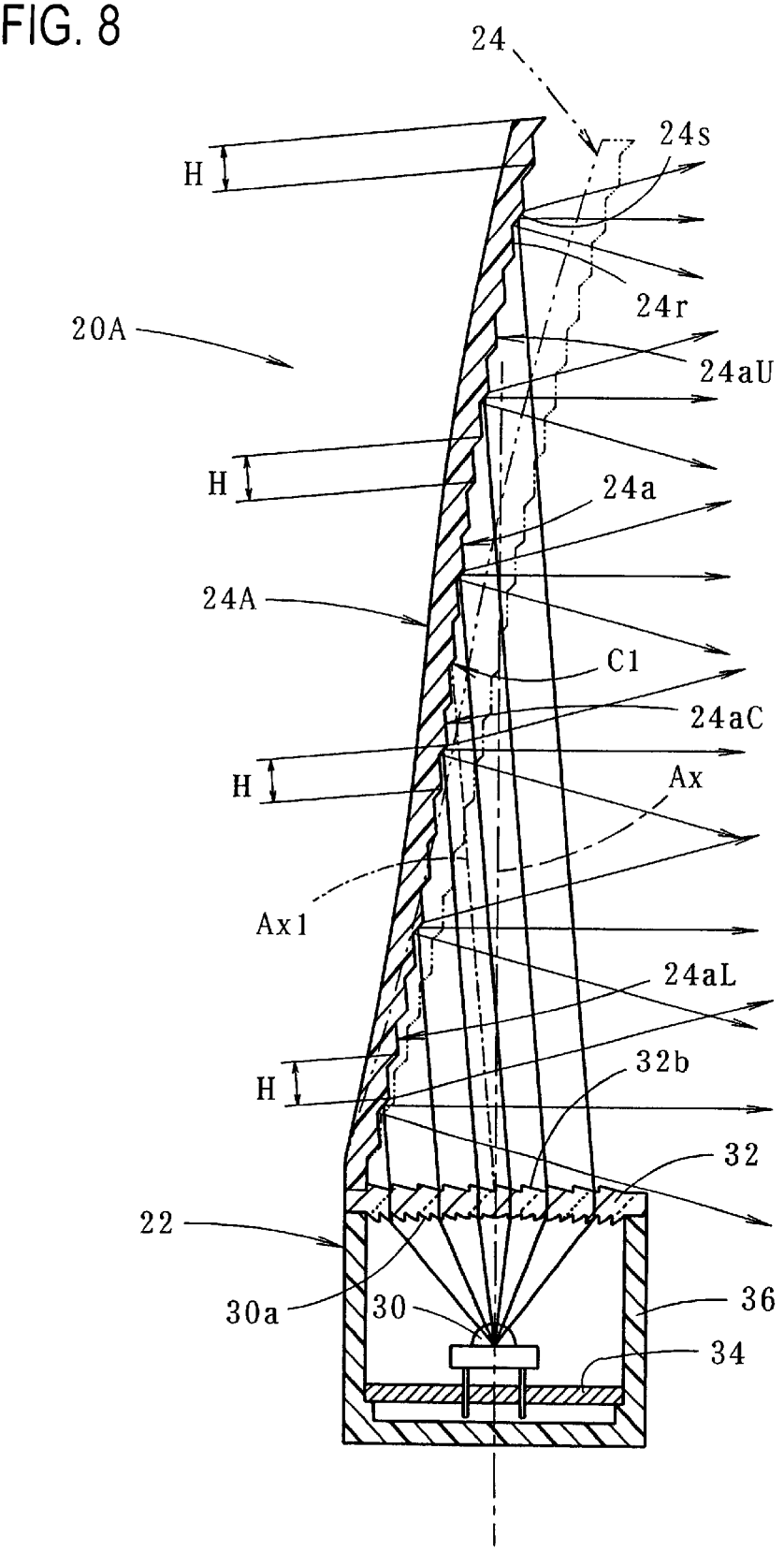
FIG. 8 is a view similar to FIG. 4 showing a modification of the LED unit.
Figure 9:
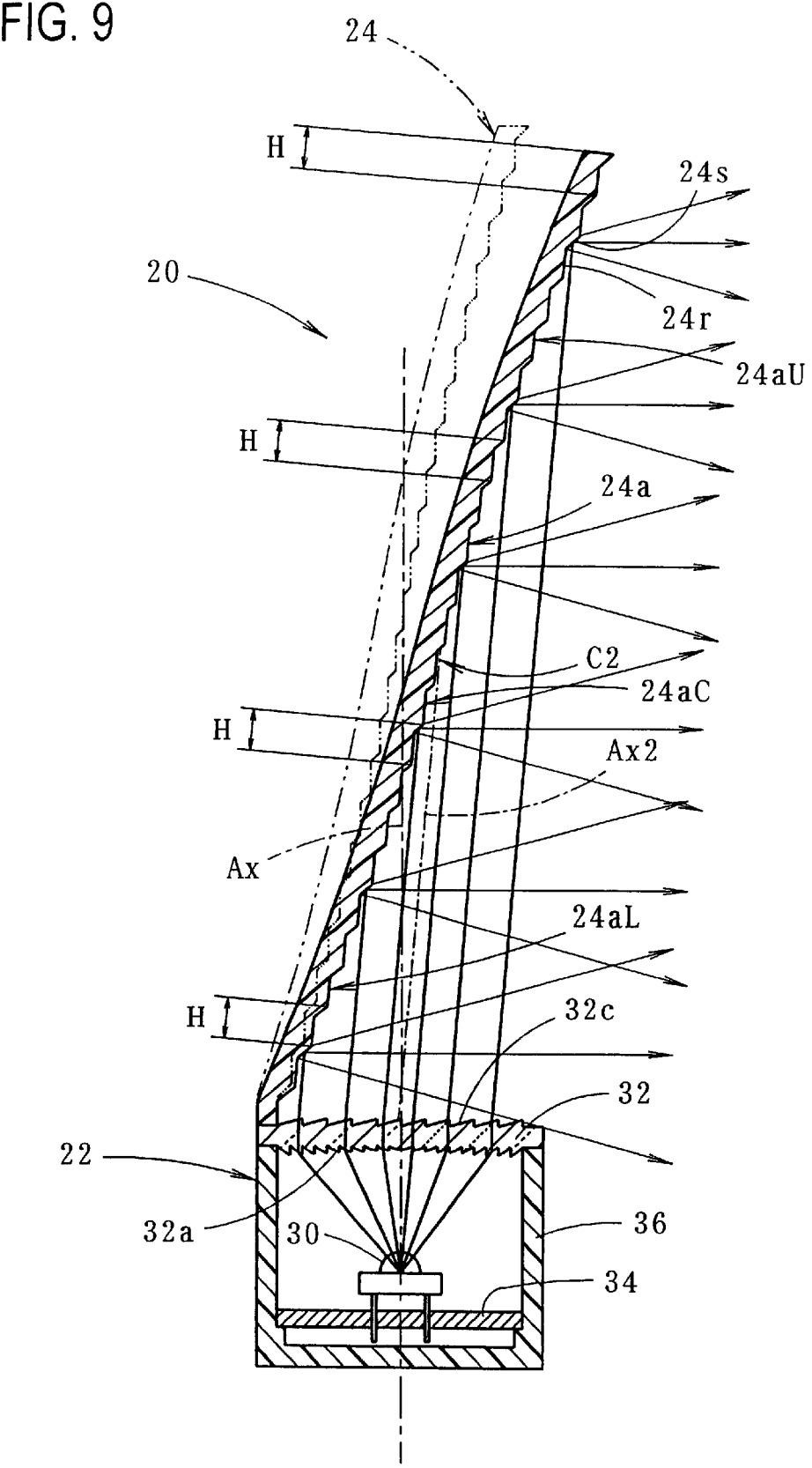
FIG. 9 is a view similar to FIG. 4 showing another modification of the LED unit.
Figure 10:
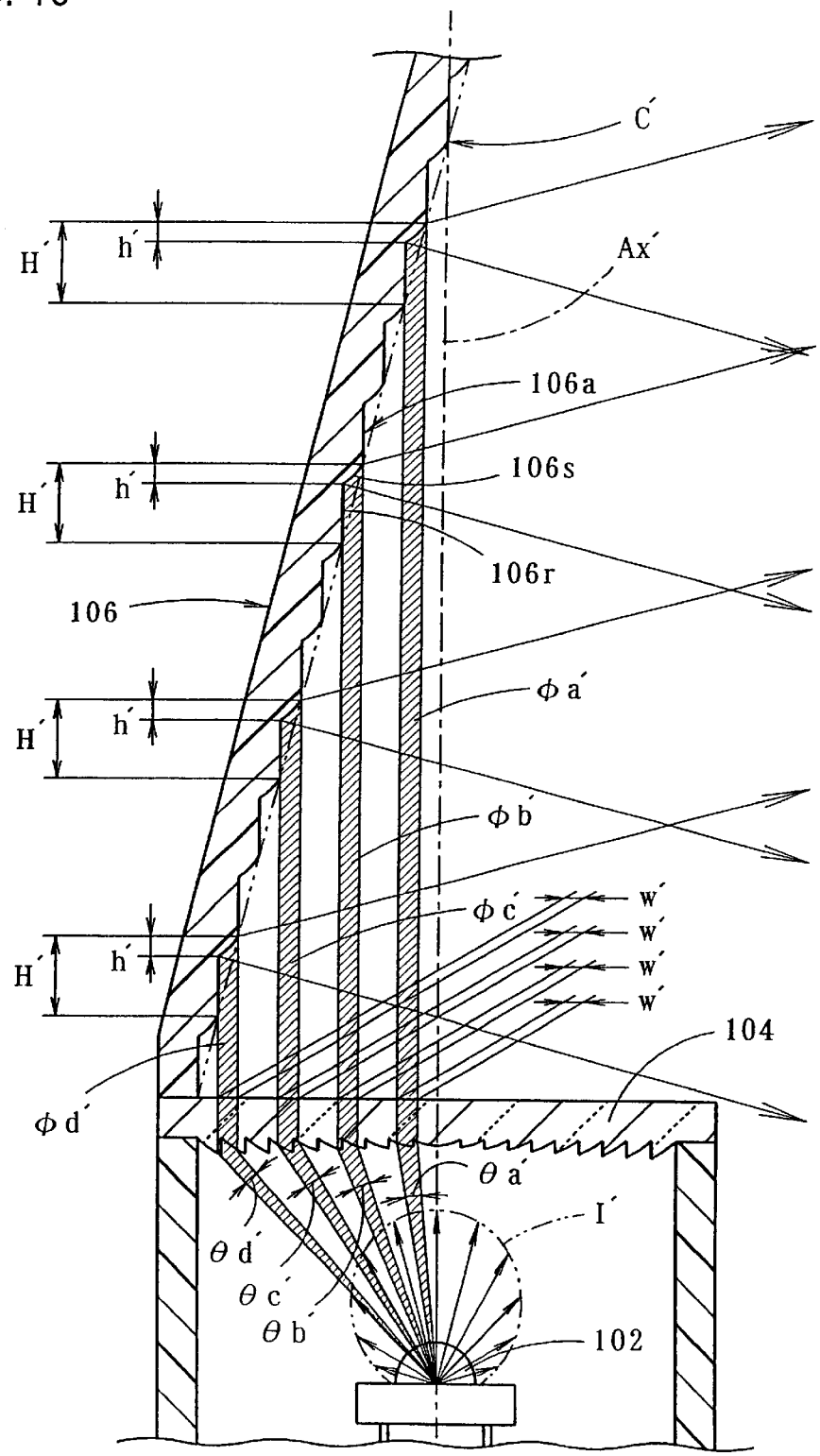
FIG. 10 is a view similar to FIG. 7 but showing a conventional lamp.

FIGS. 8 and 9 are drawings to FIG. 4 showing a modified embodiment of the LED unit 20. The LED unit 20A shown in FIG. 8 employs a plurality of prism-like deflection lens elements 32b which emit the parallel light flux transmitted through the Fresnel lens 32 in a direction inclined 5° to the rear of the lamp with respect to the optical axis Ax, which extends in the vertical direction. The prism-like deflection lens elements 32b are formed on the upper side surface of the Fresnel lens 32. The reflector 24A for the LED unit 20A is inclined to the rear of the lamp with respect to the reflector 24 (shown by a two-dot chain line) of the LED unit 20, and is structured so as to reflect the parallel light flux emitted upward in a direction inclined 5° to the rear of the lamp from the Fresnel lens 32 toward the front of the lamp in a diffused manner. The reflecting surface 24a of the reflector 24A is sectioned into a plurality of segments at a uniform interval H with respect to the radiating direction of the parallel light flux, and a reflective element 24s and step portion 24r are provided in each of the segments, whereby the reflecting surface is formed in a stepped shape. Further, the reflecting surface 24a is structured so as to reflect the parallel light flux from the Fresnel lens 32 toward the front of the lamp in a diffused manner in each of the reflective elements 24s, and each of the step portions 24r is formed as a surface extending in the radiating direction of the parallel light flux so that the parallel light flux from the Fresnel lens 32 does not enter. The width in the longitudinal direction of the lamp of each of the reflective elements 24s is set such that the width of the reflective elements 24s constituting the peripheral areas 24aU and 24aL positioned in both upper and lower sides of the reflective elements 24s constituting the central area 24aC are larger than the width of the reflective elements 24s constituting the central area 24aC near the intersection point C1 with respect to the optical axis Ax1 of the parallel light flux on the reflecting surface 24a.

On the contrary, in the LED unit 20B shown in FIG. 9 a plurality of prism-like deflection lens elements 32c, which emit a parallel light flux transmitted through the Fresnel lens 32 in a direction inclined 5° to the front of the lamp with respect to the optical axis Ax extending in the vertical direction, are formed on the upper side surface of the Fresnel lens 32. A reflector 24B of the LED unit 20B is inclined to the rear of the lamp with respect to the reflector 24 (shown by a two-dot chain line) of the LED unit 20, as in the embodiment described above, and is structured so as to reflect the parallel light flux emitted upward in the direction inclined 5° to the front of the lamp from the Fresnel lens 32 toward the front of the lamp in a diffused manner. The reflecting surface 24a of the reflector 24A is sectioned into a plurality of segments at a uniform interval H with respect to the radiating direction of the parallel light flux, and a reflective element 24s and step portion 24r are provided in each of the segments, whereby the reflecting surface is formed in a stepped shape. Further, the reflecting surface 24a is structured such as to reflect the parallel light flux from the Fresnel lens 32 toward the front of the lamp in a diffused manner in each of the reflective elements 24s, and each of the step portions 24r is formed as a surface extending in the radiating direction of the parallel light flux such that the parallel light flux from the Fresnel lens 32 does not strike those portions. The width in the longitudinal direction of the lamp in each of the reflective elements 24s is determined such that the width of the reflective elements 24s constituting the peripheral areas 24aU and 24aL on both upper and lower sides of the reflective elements 24s constituting the central area 24aC is larger than the width of the reflective elements 24s constituting the central area 24aC positioned near an intersection point C2 with respect to an optical axis Ax2 of the parallel light flux on the reflecting surface 24a.

In these modified embodiments, since it is possible to radiate the parallel light flux in the direction inclined with respect to the optical axis Ax of the Fresnel lens 32 by forming a plurality of deflection lens elements 32b, 32c on the upper surface of the Fresnel lens 32, it is possible to radiate the parallel light flux in the direction in which the reflecting surface 24a is arranged even though the reflecting surfaces 24a of the reflectors 24A, 24B are arranged at positions slightly shifted from directly in front of the lamp in the direction of the optical axis Ax. Therefore, it is possible to increase the degree of freedom in selecting the shape of the reflector while maintaining the same effects as in the embodiment described above of making the difference in brightness between the reflective elements 24s constituting the central area 24aC of the reflecting surface 24a and the reflective elements 24s constituting the peripheral areas 24aU and 24aL substantially the same. Moreover, it is possible to achieve the same effects mentioned above using only a single Fresnel lens 32.

Further, concerning the modified embodiments a description has been given of the case where the parallel light flux from the Fresnel lens 32 is directed in a direction inclined to the rear of the lamp or to the front of the lamp with respect to the optical axis Ax. However, it is possible to direct the parallel light flux in a direction inclined leftward or rightward with respect to the optical axis Ax.

It should further be apparent to those skilled in the art that various changes in form and detail of the invention as shown and described above may be made. It is intended that such changes be included within the spirit and scope of the claims appended hereto.

What is claimed is:

1. A vehicular lamp comprising: an LED light source; a lens for forming light from said LED light source into a parallel light flux; a reflector for reflecting the parallel light flux toward a front of said lamp; and a translucent cover provided on a front of said reflector, a reflecting surface of said reflector being sectioned into a plurality of segments at a substantially uniform interval with respect to a radiating direction of said parallel light flux, and a reflective element and a step portion being formed in each of said segments whereby said reflecting surface is formed in a stepped shape, and a width in a longitudinal direction of said lamp of said reflective elements in peripheral areas on both sides in said radiating direction of said parallel light flux of a central area near an intersection point with respect to a central axis of said parallel light flux on said reflecting surface being greater than said reflective elements in said central area.

2. The vehicular lamp according to claim 1, wherein said width in said longitudinal direction of said lamp of said reflective elements increases on both sides in said radiating direction of said parallel light flux in accordance with distance from said intersection point between said parallel light flux and said central axis.

3. The vehicular lamp according to claim 2, wherein said width in said longitudinal direction of said lamp of each of said reflective elements is such that incident light fluxes onto all said reflective elements are substantially equal to each other.

4. The vehicular lamp according to claim 1, wherein each of said reflective elements comprises a curved surface which reflects said parallel light flux in a diffused manner in a vertical direction and a lateral direction.

5. The vehicular lamp according to claim 1, wherein said lens comprises a Fresnel lens comprising a plurality of Fresnel lens elements formed on a surface of said Fresnel lens on a side of said LED light source, and a plurality of deflection lens elements for radiating said parallel light flux in a direction inclined at a predetermined angle with respect to an optical axis of said Fresnel lens formed on a surface of the Fresnel lens on a side of said reflector.

6. The vehicular lamp according to claim 1, further comprising a second lamp unit provided in front of said LED light source and said lens.

7. A vehicular lamp comprising: an LED light source; a Fresnel lens for forming light from said LED light source into a parallel light flux; a reflector for reflecting the parallel light flux toward a front of said lamp; and a plain translucent cover provided on a front of said reflector, a reflecting surface of said reflector being sectioned into a plurality of segments at a substantially uniform interval with respect to a radiating direction of said parallel light flux, and a reflective element and a step portion being formed in each of said segments whereby said reflecting surface is formed in a stepped shape, each of said reflective elements comprising a curved surface which reflects said parallel light flux in a diffused manner in a vertical direction and a lateral direction, and a width in a longitudinal direction of said lamp of said reflective elements in peripheral areas on both sides in said radiating direction of said parallel light flux of a central area near an intersection point with respect to a central axis of said parallel light flux on said reflecting surface increases in accordance with distance from said intersection point between said parallel light flux and said central axis than said reflective elements in said central area.

8. The vehicular lamp according to claim 7, wherein said width in said longitudinal direction of said lamp of each of said reflective elements is such that incident light fluxes onto all said reflective elements are substantially equal to each other.

9. The vehicular lamp according to claim 7, further comprising a second lamp unit provided in front of said LED light source and said lens.

10. A vehicular lamp comprising: an LED light source; a Fresnel lens for forming light from said LED light source into a parallel light flux; a reflector for reflecting the parallel light flux toward a front of said lamp; and a translucent cover provided on a front of said reflector, a reflecting surface of said reflector being sectioned into a plurality of segments at a substantially uniform interval with respect to a radiating direction of said parallel light flux, and a reflective element and a step portion being formed in each of said segments whereby said reflecting surface is formed in a stepped shape, each of said reflective elements comprising a flat plane which reflects said parallel light flux toward said translucent cover, said cover comprising a plurality of diffusion lens elements, and a width in a longitudinal direction of said lamp of said reflective elements in peripheral areas on both sides in said radiating direction of said parallel light flux of a central area near an intersection point with respect to a central axis of said parallel light flux on said reflecting surface increases in accordance with distance from said intersection point between said parallel light flux and said central axis than said reflective elements in said central area.

11. The vehicular lamp according to claim 10, wherein said width in said longitudinal direction of said lamp of each of said reflective elements is such that incident light fluxes onto all said reflective elements are substantially equal to each other.

12. The vehicular lamp according to claim 10, further comprising a second lamp unit provided in front of said LED light source and said lens.

13. A vehicular lamp comprising: an LED light source; a Fresnel lens for forming light from said LED light source into a parallel light flux; a reflector for reflecting the parallel light flux toward a front of said lamp; and a translucent cover provided on a front of said reflector, a reflecting surface of said reflector being sectioned into a plurality of segments at a substantially uniform interval with respect to a radiating direction of said parallel light flux, and a reflective element and a step portion being formed in each of said segments whereby said reflecting surface is formed in a stepped shape, each of said reflective elements comprising a curved surface which reflects said parallel light flux in a diffused manner in one of a vertical direction and a lateral direction, said cover comprising a plurality of diffusion lens elements, and a width in a longitudinal direction of said lamp of said reflective elements in peripheral areas on both sides in said radiating direction of said parallel light flux of a central area near an intersection point with respect to a central axis of said parallel light flux on said reflecting surface increases in accordance with distance from said intersection point between said parallel light flux and said central axis than said reflective elements in said central area.

14. The vehicular lamp according to claim 13, wherein said width in said longitudinal direction of said lamp of each of said reflective elements is such that incident light fluxes onto all said reflective elements are substantially equal to each other.

15. The vehicular lamp according to claim 13, further comprising a second lamp unit provided in front of said LED light source and said lens.

* * * * *